Oct. 5, 1937.   W. I. THRALL   2,094,908
DOMESTIC WATER HEATING AND GAS SUPPLY SYSTEM
Filed Oct. 26, 1934   3 Sheets-Sheet 2
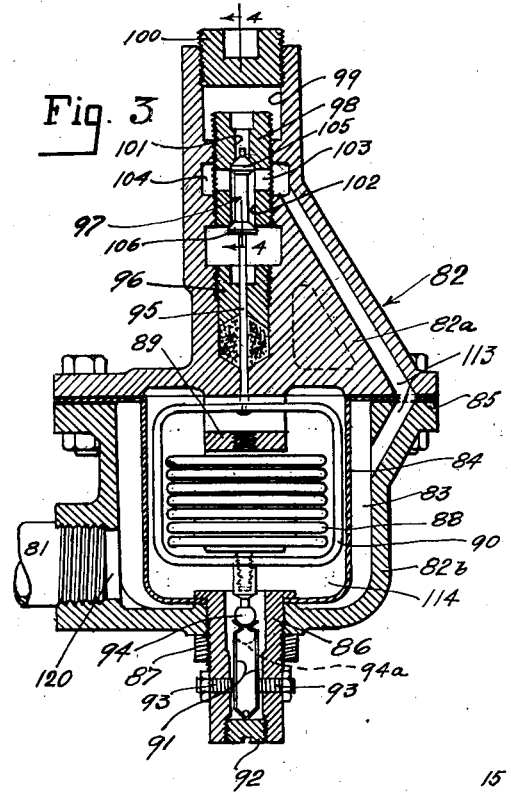
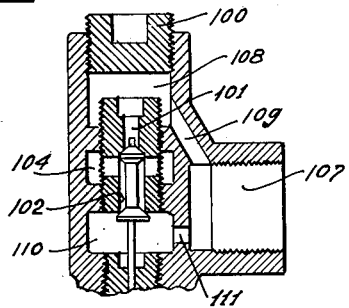
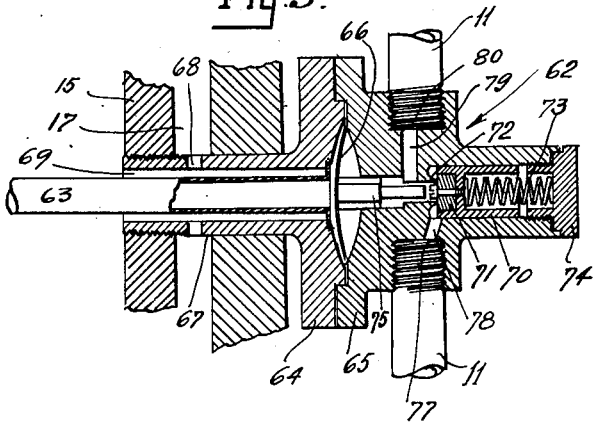
Inventor.
Walter I. Thrall.
Attorney.

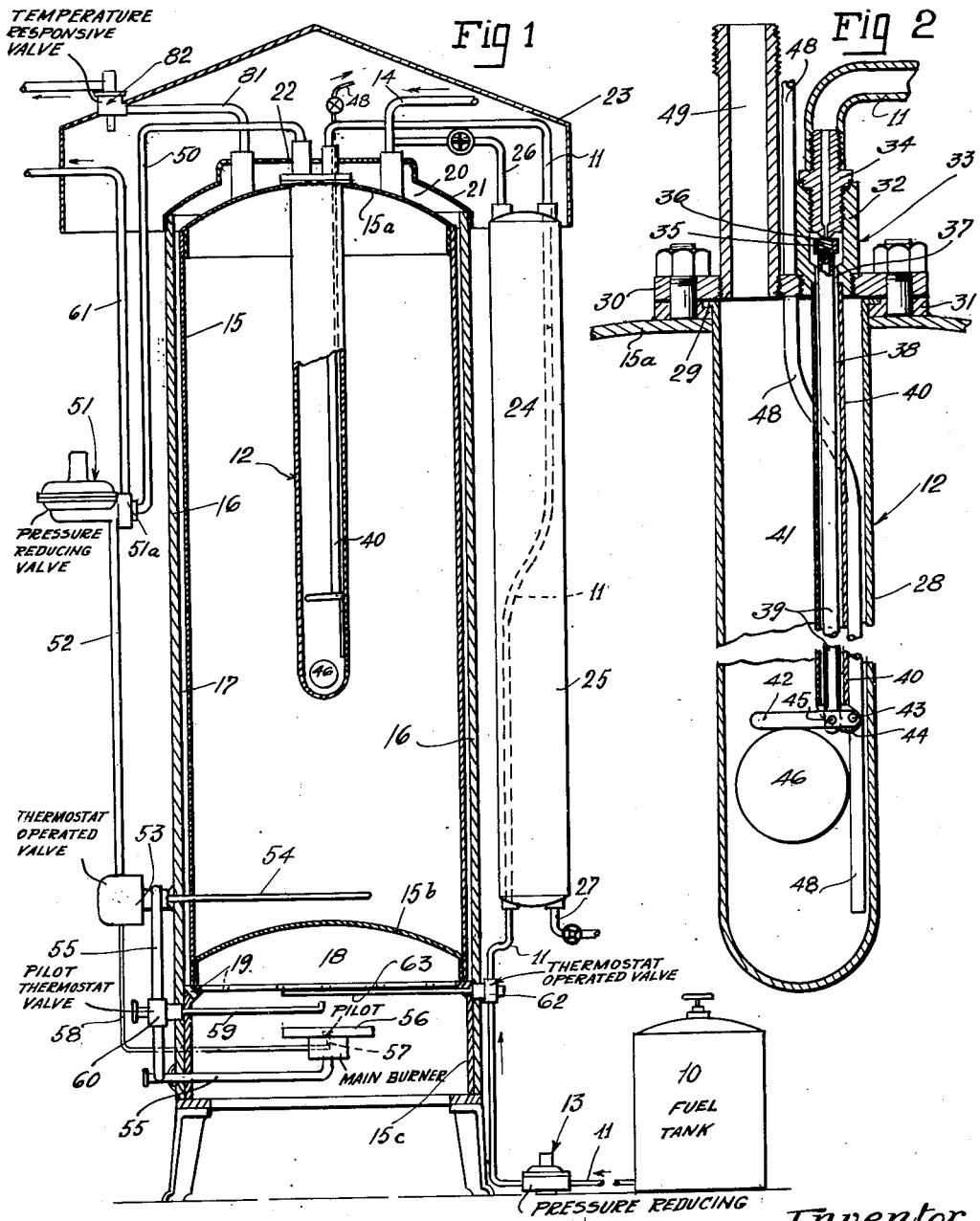

Oct. 5, 1937.  W. I. THRALL  2,094,908
DOMESTIC WATER HEATING AND GAS SUPPLY SYSTEM
Filed Oct. 26, 1934   3 Sheets-Sheet 3
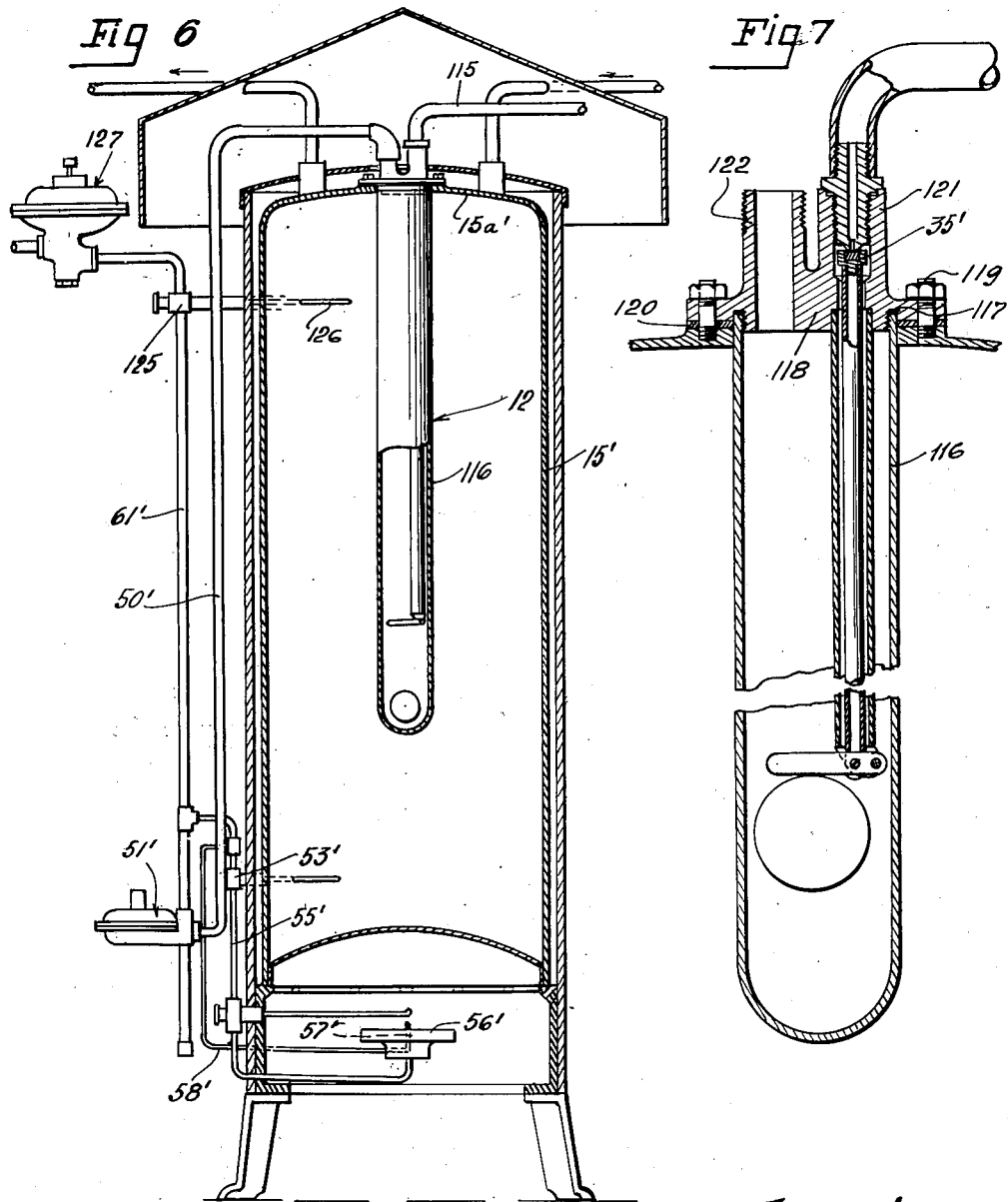
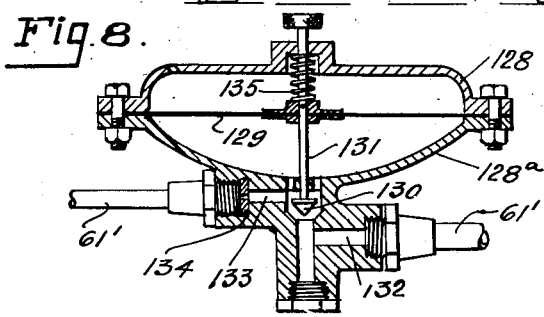
Inventor
Walter I. Thrall.
Attorney Patented Oct. 5, 1937

2,094,908

UNITED STATES PATENT OFFICE 2,094,908

DOMESTIC WATER HEATING AND GAS SUPPLY SYSTEM

Walter I. Thrall, South Pasadena, Calif.

Application October 26, 1934, Serial No. 750,228

11 Claims. (Cl. 158—53)

This invention deals generally with combined water heating and gas generating systems, particularly for purposes of domestic supply, utilizing as fuel liquefied volatile petroleum or natural gas fractions. Typical of such fuels is that commonly and hereinafter referred to as butane, which ordinarily includes along with normal butane, some iso-butane and propane. Butane is commercially distributed in high pressure drums within which the fuel is maintained in liquid phase under a pressure in the neighborhood of 60 lbs. per sq. in. at normal atmospheric temperatures. At present, this fuel finds one of its chief uses for domestic purposes in those districts where natural or manufactured gas is not available, or where their cost is excessively high.

One of my chief objects is to provide a water heating system that is specially designed to operate on butane or other fuel that may be gasified in the system, and which has all the features of convenience and safety that characterize the usual automatic gas fueled water heating systems. In most instances I prefer to provide in conjunction with the water heating system, a domestic gas supply system for household lighting, stoves, heaters and the like.

The present system includes, generally speaking, a water containing tank or shell of suitable form, heated by a burner which receives fuel through a line connecting with a supply source. The liquid fuel is vaporized by a heater placed in the fuel line and supplied with heat resulting from combustion of the gas at the burner. While the invention broadly contemplates the use of any suitable fuel vaporizer having the water heating burner as its ultimate heat supply source, I prefer to use a heater which vaporizes the fuel by transference of heat from the water itself, by reason of the more uniform temperature of the water. In the typical form hereinafter described in detail, the heater is placed within the tank and in direct contact with the hot water.

I reduce the generated gas pressure by a regulator placed in the line between the heater and the burner, and feed the gaseous fuel to the burner at a pressure slightly above atmospheric. Where the system is also to be used for gasifying the fuel for supplying domestic appliances, a gas main is connected with the low pressure side of the regulator, the gas being supplied to the main at constant pressure and at rates sufficient to meet the requirements of domestic use.

The invention involves various additional features and objects that might be set out at some length, but it is believed that all these can best be explained without necessity for further preliminary discussion, by describing certain typical and illustrative forms. In the description to follow, reference is made to the accompanying drawings, in which:

Fig. 1 is a sectional view showing a typical form of water heating and gas supply system embodying the invention;

Fig. 2 is an enlarged sectional view of the fuel heater and vaporizer;

Fig. 3 is an enlarged sectional detail of the hot water outlet control valve;

Fig. 4 is a fragmentary section taken on line 4—4 of Fig. 3;

Fig. 5 is an enlarged sectional detail of the liquid control valve;

Fig. 6 is a view similar to Fig. 1, showing another form of the invention;

Fig. 7 is an enlarged detail of the vaporizer element in Fig. 6; and

Fig. 8 is a diagrammatic illustration of the type of valve shown in Fig. 6.

Referring first to Fig. 1, numeral 10 indicates the fuel supply drum within which liquid butane is maintained under high pressure, and from the bottom of which the liquid fuel flows through line 11 to a fuel heater and vaporizer generally indicated at 12. A pressure regulator, diagrammatically indicated at 13, placed in line 11 between the heater 12 and supply drum 10, operates to reduce the fuel pressure from say 60 lbs. per sq. in. to in the neighborhood of 10 lbs. per sq. in. gage, although the extent of the pressure drop at this point may vary in different installations. As a result of the pressure drop, a portion of the liquid fuel may vaporize, cooling to a substantial extent, depending upon the pressure differential and surrounding temperature conditions, the fuel and vapor stream flowing through line 11 to the heater 12. Water is supplied through inlet 14 to a shell 15 which may be of any suitable shape, though I have shown typically a cylindric tank. The tank is surrounded by a layer 16 of heat insulating material 16 spaced at 17 from the tank to provide a vent space into which the hot gases from combustion chamber 18 enter through ports 19 and flow upwardly into space 20 between cover 21 and the top 15a of the tank, and thence out through opening 22. The top of the tank and the various hereinafter described pipes connecting therewith, are covered by a hood 23.

If desired, a cooler generally indicated at 24, may be placed in line 11 at the expansion side of pressure regulator 13. Broadly speaking, cooler 24 may be regarded as typical of any suitable mildly refrigerated unit for cooling fluids, or in fact any other commodity for household usage. As a typical example of its various possible uses, I have shown it as a water cooler in the form of a heat insulated cylinder 25 having an inlet 26 connecting with line 14 and an outlet 27. By increasing the areas of the surfaces through which heat is transferred from the liquid in cylinder 25 to the fuel in line 11, the temperature of the liquid drawn through outlet 27 may be lowered as desired. However, where the unit is used as a water cooler, it is usually advisable to limit the degree of refrigeration in order to avoid freezing. This may be done simply by extending line 11 through the cooler cylinder without special provisions being made to increase heat transfer rates and resultant cooling capacity.

The heater 12, see Fig. 2, comprises an elongated cylindric shell 28 depending within the water tank and having a top flange 29 clamped between plate 30 and a ring 31 welded to the top closure 15a of the tank. Heater shell 28 may be made of copper or any other suitable material having high heat conductivity. The liquid and vapor fuel mixture is fed to the heater through an inlet 32 connecting with line 11, the entry of fuel to the heater being controlled by a float operated valve generally indicated at 33. The valve assembly comprises a bushing 34 threaded into the inlet 32, and a valve 35 carrying a composition insert 36 which seats against the lower end of the bushing. Fuel admitted past the valve flows downwardly through grooves 37 into annular space 38 between the valve operating rod 39 and a surrounding tube 40, and thence into the bottom portion of the heating chamber 41.

Under normal conditions, for example when the water temperature within tank 15 is around 105° to 140° F., the liquid fuel entering the heating chamber 41 will become completely vaporized as fast as it flows into the chamber by heat transferred from the water through the wall of shell 28. As a precautionary measure to prevent the accumulation of excess unvaporized fuel within the heater chamber, as might possibly result from abnormally low water temperatures in the tank or faulty operation of a valve in the fuel line, I provide a float control for the fuel inlet valve 33 that operates to close the valve when liquid fuel accumulating in the heater rises to a predetermined level.

The float control comprises a lever 42 pivoted at 43 to a lug 44 carried on the lower end of pipe 40, and having a pin-and-slot connection at 45 with the lower end of the valve rod 39. Float ball 46 normally rests on the bottom of the heater shell, but as liquid fuel accumulates, the float rises to the illustrated position at which it engages lever 42 to close inlet valve 33. As the accumulated body of liquid fuel vaporizes, the float lowers to open the inlet valve and to admit more fuel to the heater. Pipe 48 is a blow-off line through which chamber 41 may be purged of water, oil or other foreign substances accumulating in the bottom of the shell.

Vaporized fuel leaves the heater through an outlet 49 connecting via line 50 with a suitable pressure regulator, diagrammatically indicated at 51, which operates to subject the fuel to a second pressure reduction. The burner fuel supply line 52 leads from the low pressure outlet 51a of regulator 51 to a valve 53 controlled in accordance with the water temperature in tank 15 by thermostat 54. Valve 53 in turn regulates the flow of fuel through pipe 55 to the main burner 56. Pilot burner 57 receives fuel through line 58 continuously and uninfluenced by thermostat valve 53. Should the pilot burner flame become extinguished, thermostat 59 acts in the ordinary manner to close valve 60, thus shutting off further flow of fuel to the main burner. The illustrated arrangement of burner supply lines and temperature responsive valves are common practice and need not be shown or described in detail.

In the usual installation, regulator 51 will reduce the fuel pressure to around 10" of water, although the pressure reduction in this final stage may be adjusted to suit the requirements of any particular installation. In addition to the burner supply line 52, a gas main 61 connects with the regulator outlet, this main serving as a gas supply line to which the usual gas consuming household appliances may be connected. As will be understood from the foregoing, the fuel in main 61 is completely gasified and is supplied at uniform predetermined pressure.

It is desirable that in the event both the pilot and master burner flames becomes extinguished, the flow of fuel to the entire system be discontinued to avoid accumulation of unvaporized butane in the lines, and to forestall erratic operation resulting from fuel vaporization by conduction of atmospheric heat alone. For this purpose I provide a valve 62 located in line 11 between cooler 24 and regulator 13, and operated by the expansion and contraction of ether or other volatile fluid contained within a tube 63 disposed directly above the pilot burner. This valve, as shown in detail in Fig. 5, comprises body sections 64 and 65 between which a diaphragm 66 is clamped. Body section 64 has a nipple 67 screwthreaded into the wall of base 15e. Vent openings 68 pass hot gases within the annular space 69 between the nipple and tube 63, into space 17. The valve body section 65 contains a valve 70 carrying a composition insert 71 which is pressed against the seat 72 by coil spring 73. the compression of the latter being adjustable by turning nut 74.

As previously stated, tube 63 contains a volatile expansible fluid, and while the tube is being heated by the pilot flame, the fluid remains in an expanded condition exerting sufficient pressure against diaphragm 66 to move plunger 75 into engagement with valve 70 and to hold the valve open against the resistance of spring 73. While the valve is open, fuel flows from inlet 77 through passages 78 and 79 to the outlet 80. Should the pilot flame become extinguished, the fluid in tube 63 cools to the point at which its pressure against diaphragm 66 is overcome by spring 73, causing valve 70 to seat and shut off further fuel flow through line 11. It will be observed that valve 70 closes in the general direction of fluid flow, in distinction to other types of valves that close against the flow. This feature is of importance in the present system by reason of the fact that the valve will under all conditions seat positively to close off the flow, regardless of pressure and temperature conditions existing within the fuel line 11.

Hot water for domestic supply passes from tank 15 through outlet line 81, within which is installed a valve device, generally indicated at 82, which operates automatically to reduce, and in the particular form herein illustrated, (see Figs. 3 and 4) to entirely shut off the supply from the tank when the water temperature drops below a predetermined minimum. For example, the valve may be adjusted to close when the water temperature falls to around 90° F. By thus controlling the outlet flow in accordance with the water temperature, it is assured that sufficient heat will be available in the tank water to completely vaporize, at the rate required, the liquid fuel introduced to heater 12.

Valve 82 comprises upper and lower body sections 82a, 82b, the latter forming a chamber 83 within which is placed a copper or other heat conductive shell 84 having a top flange 85 clamped between the body sections. The bottom of shell 84 is clamped between a flanged nipple 86 and the bottom wall of the body, the nipple being taken up tightly by nut 87 to prevent fluid leakage into the shell. Shell 84 contains a temperature responsive element shown typically as a longitudinally expansible bellows 88 fixed at its upper end to body lug 89 and carrying on its lower end a rectangular yoke 90. Nipple 86 contains a pair of spring detents 91 attached to plug 92 and adjustable as to spread by screws 93. Detents 91 act to releasably engage a spherical knob 94 depending from the bellows yoke 90, as will later appear more fully.

Yoke 90 is attached to a vertically movable valve rod 95 extending through a guide plug 96 and carrying the valve 97. The valve is a pressure balanced type operated in accordance with longitudinal expansion and contraction of the bellows 88. The valve assembly comprises an insert 98 threaded into the upper body section 82a and removable for replacement or repair through bore 99 closed by removable plug 100. The insert 98 has an upper bore 101 and a lower counterbore 102 communicating through ports 103 with an annular body channel 104. Valves 105 and 106 seating against the lower ends of bores 101 and 102, respectively, control the passage of fluid from channel 104 to the outlet 107, see Fig. 4, by way of bore 101, chamber 108 and passage 109, and through bore 102, chamber 110 and port 111.

Water from the tank 15 enters chamber 83 through inlet 112 and flows upwardly to the annular space 104 through passage 113. Heat contained in the water circulating around shell 84 is conducted through air chamber 114 to the bellows 88, causing the latter to expand or contract as the water temperature increases or decreases. When the water temperature is below a predetermined minimum, the valve 97 is closed and the parts are in the positions shown in Fig. 3. As the water temperature increases, bellows 88 expands downwardly, lowering yoke 90 and opening valve 97 to permit the flow of water through bore 101, chamber 108 and passage 109 to the outlet, and through bore 102, chamber 110 and port 111.

The bellows continues to expand to the point at which knob 94 reaches the dotted line position 94a in which it is engaged by the spring detents 91. The valve is now fully opened, with any tendency to close as a result of contraction of the bellows being resisted by the action of the detents 91. Thus when the water temperature begins to drop as the hot water supply in the tank becomes depleted, valve 97 does not close progressively but is held fully open by the detents until a predetermined temperature drop occurs. At that point the contractive force of the bellows 88 becomes sufficient to release knob 94 from the detents and to cause the valve to suddenly close. Since further withdrawal of water is thus prevented, the water temperature in the tank returns to normal within a comparatively short time.

In Figs. 6 to 8 I show another form of the invention which, though last to be described, may be regarded as a preferred embodiment. While generally similar to the previously described system, the variational form differs primarily in the elimination of certain parts in the liquid fuel feeding system, and in the provision of certain valve controls in the gas supply line. To shorten the description, similar parts in the two forms are designated by corresponding numerals with primes added in the variational form.

Liquid fuel is fed to the vaporizing element 12 through line 115 which may connect with any suitable supply source. In case butane is used as fuel, line 115 may connect with the butane of a supply drum, not shown. It will be noted that in this instance the fuel is fed to the vaporizer inlet without a previous reduction in pressure, so that the pressure within shell 116 will correspond to the pressure within the supply line 115, except for whatever reduction that may take place at valve 35'. Shell 116 will be made sufficiently strong to withstand the vapor pressure of the most volatile fuels. A certain amount of pressure drop and expansion of the fuel may occur at valve 35', although not necessarily, and if desired the valve may be designed so that a considerable pressure reduction and corresponding expansion of the fuel will occur at this point.

In Fig. 7, I show a different form of mounting for the fuel vaporizing element, having the advantage that the entire unit may be withdrawn from the water tank without disconnecting the inlet and outlet casting from the vaporizer shell. Here the upper end of shell 116 is screwthreaded into an annular groove 117 within casting 118, this type of joint between the shell and casting being used to resist radial expansion strains on the shell due to high internal pressures. Casting 118 is attached to the top 15a' of shell 15' by bolts 119 of gasket 120 being interposed to prevent leakage from shell 15'. The liquid fuel inlet 121 and gas outlet 122 are formed as integral parts of the casting 118. In order to replace or repair the vaporizing element, it is only necessary to remove the nuts from bolts 119, disconnect the fuel and gas lines, and lift the unit out of the water shell.

As in the previously described form, generated gas flows through line 50' to regulator 51' and then into the gas main 61' connecting with the low pressure outlet of the regulator. The low pressure gas is fed to the main burner 56' through line 55' under control of thermostat valve 53', and to pilot burner 57' through line 58'. In gas main 61', certain automatic shut off valves are provided in order that if for any reason the water temperature in shell 15' drops below that required for heating and vaporizing the fuel at the normal rate of consumption, the supply of gas will become automatically shut off. Other provisions are made whereby excessive rates of gas consumption are prevented, and whereby once the gas supply is discontinued, manual operation is required to again open the gas main.

A reverse acting thermostat valve 125 actuated by the usual element 126 projecting into the body of water in tank 15', operates to shut off the flow of gas through main 61' when the water temperature drops below a predetermined degree. This type of thermostat valve is common and need not be shown in detail. A pressure responsive automatic shut off valve 127 installed in line 61' beyond valve 125 operates to shut off the gas flow when the line pressure drops below a predetermined amount. This general type of valve is also commonly known and used in other installations, and need not be described further than by referring to a diagrammatic showing in Fig. 8, which is intended merely to typify known valves of this character.

The device is shown diagrammatically to comprise a body having sections 128 and 128a between which is clamped a diaphragm 129 carrying a valve 130, which has a rod 131 projecting through the top of the body so as to be accessible for manual operation. Valve 130 controls the flow of gas from inlet passage 132 to outlet passage 133, and normally is fully opened in the position shown so that it affords no substantial restriction to gas flow between the said passages. An orifice disk 134 is placed in the outlet for the purpose of restricting the gas stream to such an extent that the maximum rate at which gas can be used from the main 61' will not exceed the maximum rate at which the liquid fuel can be completely gasified within vaporizer 116.

Valve 130 normally is held open by the line pressure acting against the under side of diaphragm 129 and against the resistance of spring 135. However, when the thermostat valve 125 closes to shut off the gas flow, spring 135 overcomes the resultant reduced pressure acting against the diaphragm and closes the valve. Thereafter, when the water temperature in shell 15' again rises to normal, valve 125 will automatically open the gas main up to regulator 127, but the latter will still remain closed because of the fact that the pressure acting against valve 130 will alone be insufficient to overcome the resistance offered by spring 135. The consumer then is obliged to manually raise the valve stem 131 to restore the line pressure against the underside of the diaphragm, so that the valve will remain open to put the gas main back in service. This requirement for manual operation of a precautionary measure taken to direct the consumer's attention to the fact that the gas generating system is again in service and that all open burners not in use should be closed.

I claim:

1. In a system of the character described, a closed water containing tank having an inlet, an outlet, and a top wall having an opening of smaller cross sectional size than the cross sectional area of the tank, means for heating the water in the tank, a liquid fuel vaporizing element comprising a hollow heat conductive shell adapted to be inserted through said opening in the top wall of the tank and submersed in the water therein, means for securing said shell to the top wall of the tank, and a fuel inlet and a gas outlet connecting with the top of said shell.

2. In a system of the character described, a closed water containing tank having an inlet, an outlet, and a top wall having an opening of smaller cross sectional size than the cross sectional area of the tank, means for heating the water in the tank, a liquid fuel vaporizing element comprising a hollow heat conductive shell adapted to be inserted through said opening in the top wall of the tank and submersed in the water therein, means for detachably fastening said shell to the top wall of the tank to permit removal of the shell through said opening, and a fuel inlet and a gas outlet connecting with the top of said shell.

3. In a system of the character described, a closed water containing tank having an inlet, an outlet, and a top wall having an opening of smaller cross sectional size than the cross sectional area of the tank, means for heating the water in the tank, a liquid fuel vaporizing element comprising a hollow heat conductive shell adapted to be inserted through said opening in the top wall of the tank and submersed in the water therein, a head secured to said shell, means for fastening said head to said top wall of the tank, and a fuel inlet and a gas outlet connecting with said head.

4. In a gas generating unit, a liquid containing tank having a top wall, means for heating liquid in the tank, a fuel vaporizing element comprising a heat conductive shell immersed in the liquid within said tank, a flange on the top of said shell, means for attaching said flange to the top wall of said tank, and a fuel inlet and a gas outlet connecting with the top of the shell.

5. In a gas generating unit, a liquid containing tank having a top wall, means for heating liquid in the tank, a fuel vaporizing element comprising a heat conductive shell immersed in the liquid within said tank and including a head secured to the upper end of said shell, means for fastening said shell to said top wall of the tank, and a fuel inlet and a gas outlet connecting with said head.

6. In a gas generating unit, a liquid containing tank having a top wall containing an opening of smaller size than the cross sectional area of the tank, means for heating the liquid in the tank, a fuel vaporizing element comprising a hollow heat conductive shell adapted to be inserted through said opening in the top wall of the tank and immersed in the liquid therein, means for detachably securing said shell to the top wall of the tank to permit removal of the shell through said opening, and a fuel inlet and a gas outlet connecting with the top of said shell.

7. In a gas generating unit, a liquid containing tank having a top wall containing an opening of smaller size than the cross sectional area of the tank, means for heating the liquid in the tank, a fuel vaporizing element comprising a hollow heat conductive shell adapted to be inserted through said opening in the top wall of the tank and immersed in the liquid therein, a head secured to the upper end of said shell, means for detachably fastening said head to the top wall of the tank to permit removal of the shell through said opening, and a fuel inlet and a gas outlet connecting with said head.

8. In a gas generating unit, a liquid containing tank having a top wall, means for heating liquid in the tank, a fuel vaporizing element comprising a heat conductive shell immersed in the liquid within said shell and supported by said top wall of the tank, a head secured to the upper end of said shell, a fuel inlet and a gas outlet connecting with said head, and means associated with said head for automatically restricting the flow of fuel into said shell as unvaporized fuel accumulates therein.

9. In a system of the character described, a closed water containing tank having an inlet, an outlet, and a top wall having an opening of smaller cross sectional size than the cross sectional area of the tank, a liquid fuel vaporizing element comprising a hollow heat conductive shell adapted to be inserted through said opening in the top wall of the tank and submersed in the water therein, means for securing said shell to the top wall of the tank, a fuel inlet and a gas outlet connecting with the top of said shell, and a burner for heating the water in said tank and supplied with gaseous fuel from said shell.

10. In a gas generating unit, a liquid containing tank having a top wall, a fuel vaporizing element comprising a heat conductive shell immersed in the liquid within said tank, a flange on the top of said shell and attached to the top wall of the tank, a fuel inlet and a gas outlet connecting with the top of the shell, and a burner for heating the water in said tank and supplied with gaseous fuel from said shell.

11. In a gas generating unit, a liquid containing tank having a top wall, a fuel vaporizing element comprising a heat conductive shell immersed in the liquid within said tank and having a top closure, means connecting said shell with said top wall of the tank, a fuel inlet and an outlet connecting with said top closure of the shell, a burner for heating the liquid in said tank, and a gas supply line connecting said burner with said fuel outlet.

WALTER I. THRALL.